US012748571B2

(12) United States Patent
Sarno

(10) Patent No.: US 12,748,571 B2
(45) Date of Patent: Sep. 29, 2026

(54) MULTIPLICATION WITH DATA PROTECTION

(71) Applicant: STMICROELECTRONICS (ROUSSET) SAS, Rousset (FR)

(72) Inventor: Thomas Sarno, Fuveau (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 1000 days.

(21) Appl. No.: 17/981,191

(22) Filed: Nov. 4, 2022

(65) Prior Publication Data

US 2023/0111089 A1 Apr. 13, 2023

(51) Int. Cl.

| | |
|---|---|
| ***G06F 7/76*** | (2006.01) |
| ***G06F 7/523*** | (2006.01) |
| ***G06F 21/60*** | (2013.01) |

(52) U.S. Cl.

CPC .............. *G06F 7/764* (2013.01); *G06F 7/523* (2013.01); *G06F 21/60* (2013.01)

(58) Field of Classification Search

CPC .......... G06F 21/60; G06F 7/523; G06F 7/764; G06F 2207/7233–7238; H04L 2209/04; H04L 2209/046

See application file for complete search history.

(56) References Cited

U.S. PATENT DOCUMENTS

| | | | | |
|---|---|---|---|---|
| 2005/0283714 | A1* | 12/2005 | Korkishko | G06F 7/724 714/781 |
| 2014/0281573 | A1* | 9/2014 | Jaffe | H04L 9/003 713/189 |
| 2019/0379529 | A1* | 12/2019 | Meyer | H04L 9/008 |
| 2021/0109711 | A1* | 4/2021 | Peyrard | H04L 9/003 |
| 2021/0157586 | A1* | 5/2021 | Vigilant | H04L 9/002 |
| 2021/0165633 | A1* | 6/2021 | Guilley | G06F 7/501 |

FOREIGN PATENT DOCUMENTS

| | | | | |
|---|---|---|---|---|
| FR | 3129011 A1 * | 5/2023 | | G06F 7/523 |
| WO | WO 03060695 A1 | 7/2003 | | |

OTHER PUBLICATIONS

T. Sugawara, "3 Share Threshold Implementation of AES S box without Fresh Randomness," IACR Transactions on Cryptographic Hardware and Embedded Systems, pp. 123 145, 2019.

(Continued)

*Primary Examiner* — Matthew D Sandifer

(74) *Attorney, Agent, or Firm* — Seed IP Law Group LLP

(57) ABSTRACT

A device includes a memory, which, in operation, stores one or more look-up tables, and cryptographic circuitry coupled to the memory. The cryptographic circuitry, in operation, multiplies first data masked with a first mask by second data masked with a second mask, and protects the first data and the second data during the multiplying. The multiplying and protecting includes remasking the first data with a third mask, remasking the second data with a fourth mask, executing one or more compensation operations using one or more of the one or more look-up tables, and generating third data masked with a fifth mask. The fifth mask is independent of the first, second, third, and fourth masks. The third data corresponds to the first data multiplied by the second data.

32 Claims, 4 Drawing Sheets

(56) References Cited

OTHER PUBLICATIONS

Gross et al., "Domain Oriented Masking: Compact Masked Hardware Implementations with Arbitrary Protection Order," Institute for Applied Information Processing and Communications, 2016, 24 pages.
De Meyer et al., "Multiplicative Masking for AES in Hardware," IACR Transactions on Cryptographic Hardware and Embedded Systems, 2018(3), 431-468. https://doi.org/10.13154/tches.v2018.i3.431-468.

* cited by examiner

MULTIPLICATION WITH DATA PROTECTION

BACKGROUND

Technical Field

The present disclosure generally concerns the protection of binary data and the protection of operations capable of being applied to such binary data. The present disclosure more particularly concerns the implementation of a multiplication of masked binary data carried out in secure fashion.

Description of the Related Art

During the use of critical data, the data is masked during processing by an electronic device, such as a processor.

BRIEF SUMMARY

In an embodiment, a method comprises multiplying, using an electronic device, first data masked with a first mask by second data masked with a second mask, and protecting the first data and the second data during the multiplying. The multiplying and protecting includes: remasking the first data with a third mask; remasking the second data with a fourth mask; executing one or more compensation operations using one or more look-up tables; and generating third data masked with a fifth mask. The fifth mask is independent of the first, second, third, and fourth masks. The third data corresponds to the first data multiplied by the second data.

In an embodiment, a device includes a memory, which, in operation, stores one or more look-up tables, and cryptographic circuitry coupled to the memory. The cryptographic circuitry, in operation, multiplies first data masked with a first mask by second data masked with a second mask, and protects the first data and the second data during the multiplying. The multiplying and protecting includes remasking the first data with a third mask, remasking the second data with a fourth mask, executing one or more compensation operations using one or more of the one or more look-up tables, and generating third data masked with a fifth mask. The fifth mask is independent of the first, second, third, and fourth masks. The third data corresponds to the first data multiplied by the second data.

In an embodiment, a system comprises an application processor, which, in operation, executes one or more applications, and cryptographic circuitry coupled to the application processor. The cryptographic circuitry, in operation, multiplies first data masked with a first mask by second data masked with a second mask, and protects the first data and the second data during the multiplying. The multiplying and protecting includes: remasking the first data with a third mask; remasking the second data with a fourth mask; executing one or more compensation operations using one or more look-up tables; and generating third data masked with a fifth mask. The fifth mask is independent of the first, second, third, and fourth masks. The third data corresponds to the first data multiplied by the second data.

In an embodiment, a non-transitory computer-readable medium's contents configure cryptographic circuitry to perform a method. The method comprises multiplying first data masked with a first mask by second data masked with a second mask, and protecting the first data and the second data during the multiplying. The multiplying and protecting includes, remasking the first data with a third mask, remasking the second data with a fourth mask, executing one or more compensation operations using one or more look-up tables, and generating third data masked with a fifth mask. The fifth mask is independent of the first, second, third, and fourth masks. The third data corresponds to the first data multiplied by the second data. In an embodiment, the contents comprise the one or more look-up tables. In an embodiment, the contents comprise instructions executed by the cryptographic circuitry.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front," "back," "top," "bottom," "left," "right," etc., or to relative positional qualifiers, such as the terms "above," "below," "upper," "lower," etc., or to qualifiers of orientation, such as "horizontal," "vertical," etc., reference is made to the orientation shown in the figures.

Unless specified otherwise, the expressions "around," "approximately," "substantially" and "in the order of" signify within 10%, within 5%.

Figure 1:
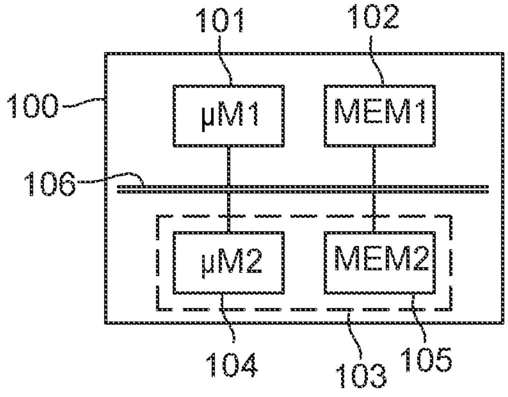
FIG. 1 very schematically shows in the form of blocks an example of an electronic device to which the embodiments may apply.

FIG. 1 very schematically shows in the form of blocks an example of an electronic device 100 to which the embodiments described may apply.

Device 100 is an electronic device adapted to processing data. Device 100 comprises at least one processor 101 (μM1), or microprocessor adapted to processing control signals and to implementing one or a plurality of software programs. Electronic device 100 further comprises one or a plurality of memory devices 102 (MEM1) having data and instructions stored therein. Device 100 may comprise memory devices 102 of different types, for example, one or a plurality of read-only memories, one or a plurality of volatile memories, one or a plurality of rewritable non-volatile memories, etc., or combinations thereof.

Further, and for the implementation of the embodiments described in relation with FIGS. 3 to 6, device 100 is particularly adapted to processing secret data, and more precisely masked data. For this purpose, device 100 may use processor 101 and memory device(s) 102, but device 100 may further comprise a secure portion 103 formed of a or of a portion of a processor 104 and of a portion of one or a plurality of memory devices 105 (MEM2). The masking type used to implement the embodiments described in relation with FIGS. 3 to 6 is described in relation with FIG. 2.

The different processors 101 and 104 and the different memory devices 102 and 105 of device 100 may communicate together, for example, via one or a plurality of computer buses 106.

According to another example, another type of electronical device, to which the embodiments described in relation with FIGS. 3 to 6, for example, may apply, is a cryptographic accelerator. A cryptographic accelerator is an electronical device, for example similar to a calculator, to a secondary processor or a secondary microprocessor, to which the use is specifically dedicated to the execution of operation, algorithm, and/or calculus associated to cryptography and/or data cyphering.

Figure 2:
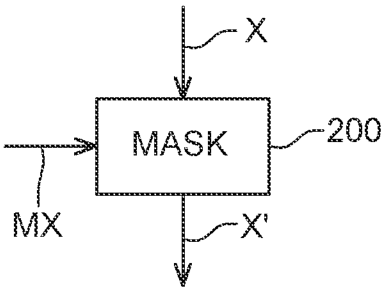
FIG. 2 very schematically shows in the form of blocks the implementation of a binary data masking operation.

FIG. 2 schematically shows in the form of blocks the implementation of an operation of masking 200 (MASK) of binary data X with a mask MX.

Masking operation 200 enables to perform a secure processing of data by ciphering them with other binary data used as a mask. There exist different types of data masking, but in the example embodiments described hereafter, the used masking is a masking using a logic EXCLUSIVE OR-type (XOR) operation.

Thus, masking operation 200 implements a masking operation by using the following mathematical formula:

$$X' = X \text{ xor } MX \quad \text{Math 1}$$

wherein:

- operator xor designates the EXCLUSIVE OR logic operation;
- X is the binary data to be masked;
- MX is the binary data used as a mask; and
- X' is the masked binary data.

Further, an unmasking operation enabling to return data X from the data X' masked with mask MX applies the same operation as a masking operation. Indeed, masking masked data X' with mask MX amounts to canceling the first operation. In other words, an unmasking operation uses the following mathematical formula:

$$X = X' \text{xor } MX \quad \text{Math 2}$$

Figure 3:
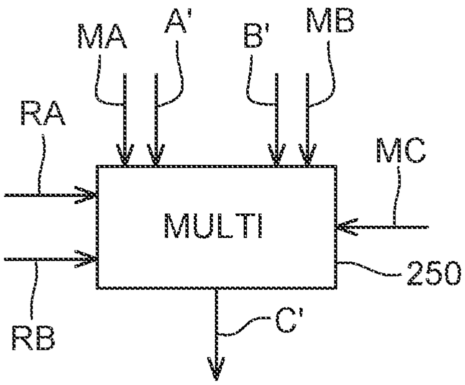
FIG. 3 very schematically shows in the form of blocks an implementation mode of a secure operation of multiplication of masked data.

FIG. 3 schematically shows in the form of blocks an embodiment of a secure operation of multiplication of two masked pieces of data A' and B'.

The secure multiplication operation is represented by a block 250 (MULTI). In the following, the secure multiplication operation is called operation 250. The secure multiplication operation is, for example, a two by two bits multiplication operation. Operation 250 receives as an input:

- masked binary data A' corresponding to binary data A masked with a mask MA;
- masked binary data B' corresponding to binary data B masked with a mask MB;
- optionally, internal masks RA and RB intended to mask data A' and B'; and
- optionally, an output mask MC intended to mask the result data.

According to an example, all the masks used by operation 250, namely masks MA, RA, MB, RB, and MC are generated during a prior calculus cycle. It allows to modify the result of the multiplication at each calculus cycle. Masks MA and MB are, typically, dependents of other masks used during the prior cycle. According to another example, operation 250 does not need being supplied with masks RA, RB, and MC and generates them itself.

Operation 250 outputs masked binary data C' corresponding to data C masked with output mask MC.

According to an embodiment, operation 250 performs a secure operation of multiplication of the input masked data, that is, data A' and B', and outputs masked data, that is, data C', corresponding to the multiplication of the unmasked input data, that is, data A and B, and masked with an output mask, that is, mask MC, independent from all the previously-used masks, that is, masks MA, MB. Thus, output masked data C' are given by the following mathematical formula:

$$C' = (A \cdot B) \text{xor } MC \quad \text{Math 3}$$

where operator · designates the logic multiplication operation.

Further, and according to an embodiment, operation 250 performs the secure operation of multiplication of masked data, here, data A' and B', by modifying the initial masks, that is, masks MA and MB, of these data, and by replacing them with internal masks, here masks RA and RB.

To obtain this result, operation 250 implements a plurality of sub-operations, among which:

- the implementation of a conventional multiplication, or conventional multiplication operation;
- one or a plurality of compensation operations and of corrections;
- one or a plurality of combination operations; and
- one or a plurality of data masking and unmasking operations, or sub-operations or steps.

The compensation and correction operation(s) enable to remove at least one term depending on masks MA, MB, RA, or RB from the result of the conventional operation of multiplication of masked data A' and B'. Detailed examples of such operations are described in relation with FIGS. 4 to 6.

According to an embodiment, these operations are all implemented by one or a plurality of lookup tables.

These operations, sub-operations, or steps, may be combined and implemented in several different ways, in various orders. Three detailed embodiments are described in relation with FIGS. 4 to 6. Other embodiments may be envisaged by those skilled in the art based on the explanations provided herein and hereafter.

Figure 4:
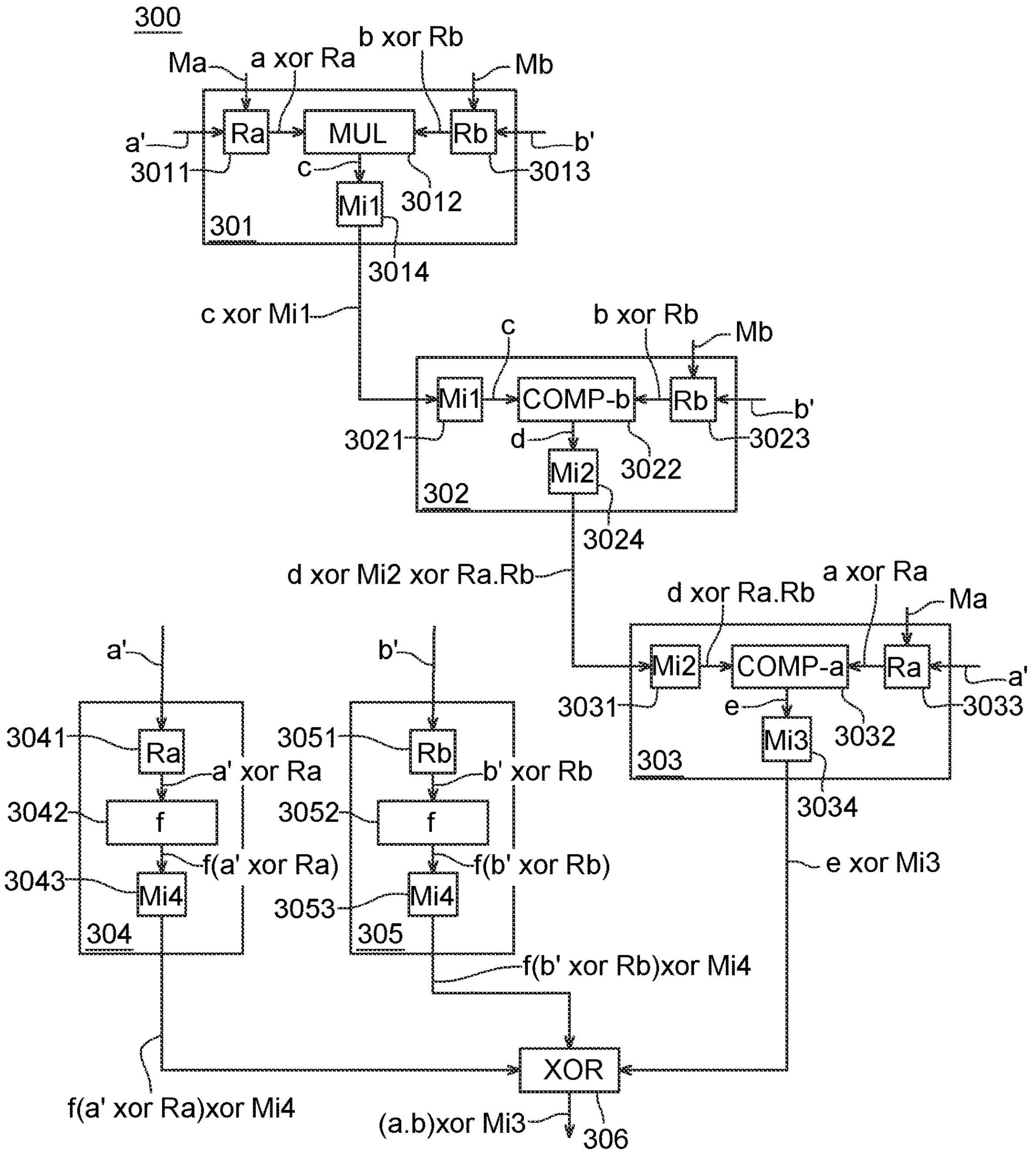
FIG. 4 very schematically shows in the form of blocks a more detailed implementation mode of a secure operation of multiplication of masked data.

FIG. 4 schematically shows in the form of blocks a detailed implementation mode of a secure multiplication operation 300 of the type of the multiplication operation 250 described in relation with FIG. 3.

In FIG. 4, secure multiplication operation 300 receives as an input masked data a' and masked data b', and their masks Ma and Mb, which are linked by the following formulas:

$$\begin{cases} a' = a \text{ xor } Ma \\ b' = b \text{ xor } Mb \end{cases} \quad \text{Math 5}$$

wherein:

a is the unmasked data a'; and b is the unmasked data b'.

Secure multiplication operation 300 comprises:

an operation 301 of multiplication of the input data;

two compensation operations 302 and 303;

two correction operations 304 and 305; and a combination operation 306.

According to an embodiment, each operation 301 to 305 is implemented by a lookup table. Further, each of operations 301 to 305 comprises masking and unmasking sub-operations or steps.

Multiplication operation 301 receives as an input masked data a' and b' and outputs masked data c xor Mi1. Operation 301 is formed of the four following sub-operations, or steps:

a masking and unmasking sub-operation or step 3011 (Ra);

a multiplication sub-operation 3012 (MUL);

a masking and unmasking sub-operation or step 3013 (Rb); and a masking sub-operation or step 3014 (Mi1).

Masking and unmasking sub-operations 3011 and 3013 receive input data a' and b' and their masks Ma and Mb. Sub-operations 3011 and 3013 are adapted to modifying the masks of the data that they receive. In practice, sub-operations 3011 and 3013 unmask the data and then mask then again with a different mask, in this order or in the reverse order. More particularly, sub-operation 3011 modifies the initial mask Ma of data a' into an internal mask Ra and outputs data a xor Ra.

Similarly, sub-operation 3013 modifies the initial mask Mb of data b' into an internal mask Rb and outputs data b xor Rb. According to an alternative embodiment, sub-operations 3011 and 3013 may be previously carried out before the implementation of operation 301.

Sub-operation 3012 receives as an input the output data of sub-operations 3011 and 3013 and performs their multiplication. Sub-operation 3012 outputs data c having the following expression:

$$c=(a \text{ xor } Ra)\cdot(b \text{ xor } Rb)=(a\cdot b)\text{xor}(a\cdot Rb)\text{xor}(b\cdot Ra)\text{xor}(Ra\cdot Rb) \quad \text{Math 6}$$

Masking sub-operation 3014 receives as an input data c, and outputs data c xor Mi1 corresponding to data c masked with an intermediate mask Mi1. This operation enables to protect the output data of operation 301, and before the implementation of operation 302.

Compensation operation 302 receives as an input masked data c xor Mi1 and b', and outputs masked data d xor Mi2 xor Ra·Rb. Operation 302 is formed of four following sub-operations, or steps:

an unmasking sub-operation 3021 (Mi1);

a compensation sub-operation 3022 (COMP-b);

a mask change sub-operation 3023 (Rb) identical to the sub-operation 3013 of operation 301; and a masking sub-operation 3024 (Mi2).

Unmasking sub-operation 3021 receives as an input data c xor Mi1 and unmasks it to output data c.

Sub-operation 3023 receives as an input masked data b', and outputs masked data b xor Rb.

Sub-operation 3022 receives as an input the output data of sub-operations 3021 and 3023. Sub-operation 3012 outputs data d having the following expression:

$$d=c \text{ xor}((b \text{ xor } Rb)\cdot Ra)\text{xor } f(b \text{ xor } Rb \text{ xor } Mb) \quad \text{Math 7}$$

where f is a function enabling to add a correction term enabling to avoid too fast an implementation of sub-operation 3022.

By replacing c with its previously-disclosed expression, and by performing a few simplifications, the expression of data d is the following:

$$d=(a\cdot b)\text{xor}(a\cdot Rb)\text{xor } f(b'\text{xor } Rb) \quad \text{Math 8}$$

Function f is more particularly a function enabling to avoid an unwanted simplification between the multiplication operation and the EXCLUSIVE OR operation. Such a simplification would result in too fast an implementation of sub-operation 3022. Too fast an implementation of a sub-operation might make operation 300 unreliable, since an ill-intentioned person might recognize the used operations and data. Function f is a function verifying the following inequality:

$$f(11)\neq 11 \quad \text{Math 9}$$

where 11 is the binary representation of number 3.

According to an example, function f implements a function sqk defined by the following mathematical formula:

$$sqk(x)=N\cdot x^2 \quad \text{Math 10}$$

wherein:

N is a scalar define in the way that sqk(x)=y, with x=x1x0 (x0 being the less significant bit, and x1 the most significant bit) and y=y1y0 (y0 being the less significant bit, and y1 the most significant bit), results in y1=x0 and y0=x0 xor x1;

$x^2$ corresponds to the result of the operation x·x.

Masking sub-operation 3024 receives as an input data d and outputs data d xor Mi2 xor Ra·Rb corresponding to data d masked with an intermediate mask Mi2 xor Ra·Rb.

Operation 303 receives as an input masked data d xor Mi2 xor Ra·Rb and a', and outputs masked data e xor Mi3. Operation 303 is formed of the four following sub-operations, or steps:

an unmasking sub-operation 3031 (Mi1);

a compensation sub-operation 3032 (COMP-a);

a mask change sub-operation 3033 (Ra) identical to the sub-operation 3011 of operation 301; and a masking sub-operation 3034 (Mi3).

Unmasking operation 3031 receives as an input data d xor Mi2 xor Ra·Rb and unmasks it to output data d xor Ra·Rb.

Sub-operation 3033 receives as an input masked data a', and outputs mask data a xor Ra.

Sub-operation 3032 receives as an input the output data of sub-operations 3031 and 3033. Sub-operation 3032 outputs data e having the following expression:

$$e=d \text{ xor } Ra\cdot Rb \text{ xor}((a \text{ xor } Ra)\cdot Rb)\text{xor } f(a \text{ xor } Ra \text{ xor } Ma) \quad \text{Math 11}$$

By replacing d with its previously-disclosed expression and by performing a few simplifications, the expression of data e is the following:

$$e=(a\cdot b)\text{xor } f(b \text{ xor } Rb \text{ xor } Mb)\text{xor } f(a \text{ xor } Ra \text{ xor } Ma) \quad \text{Math 12}$$

Masking sub-operation 3034 receives as an input data e, and outputs data e xor Mi3 corresponding to data e masked with a mask Mi3, that is, masked data e xor Mi3.

Compensation operations 302 and 303 enable to remove the terms a·Rb, b·Ra, and Ra·Rb present in the data c resulting from operation 301.

Operations 304 and 305 are correction operations enabling to remove the corrective terms of data e.

Operation 304 receives as an input masked data a', and outputs masked corrective term f(a' xor Ra) xor Mi4. Operation 304 is formed of the four following sub-operations, or steps:

a masking sub-operation 3041 (Ra);

a sub-operation of application of function f 3042 (*f*); and a masking sub-operation 3043 (Mi4).

Sub-operation 3041 masks mask data a' with internal mask Ra. Sub-operation 3041 outputs masked data a' xor Ra.

Sub-operation 3042 applies function f to data a' xor Ra, and outputs corrective term f(a' xor Ra).

Sub-operation 3043 masks corrective term f(a' xor Ra) with an intermediate mask Mi4. Sub-operation 3041 outputs masked data f(a' xor Ra) xor Mi4.

Operation 305 receives as an input masked data b', and outputs masked corrective term f(b' xor Ra) xor Mi4. Operation 304 is formed of the four following sub-operations, or steps:

a masking sub-operation 3051 (Rb);

a sub-operation of application of function f 3052 (*f*); and a masking sub-operation 3053 (Mi4).

Sub-operation 3051 masks masked data b' with internal mask Rb. Sub-operation 3051 outputs masked data b' xor Rb.

Sub-operation 3052 applies function f to data b' xor Rb, and outputs corrective term f(b' xor Rb).

Sub-operation 3053 masks corrective term f(b' xor Rb) with an intermediate mask Mi4. Sub-operation 3051 outputs masked data f(b' xor Rb) xor Mi4.

Combination operation 306 receives as an input the output data of operations 303, 304, and 305 and combines them to obtain the final result data of secure multiplication operation 300. For this purpose, operation 306 performs an EXCLUSIVE OR operation of all the data that it receives, more precisely the final result data are given by the following mathematical formula:

$$e \text{ xor } Mi3 \text{ xor } f(a' \text{ xor } Ra) \text{ xor } Mi4 \text{ xor } f(b' \text{ xor } Rb) \text{ xor } Mi4 \quad \text{Math 13}$$

By replacing e with its previously-disclosed expression and by performing a few simplifications, the expression of the final result data is the following:

$$(a \cdot b) \text{ xor } Mi4 \quad \text{Math 14}$$

Thus, and as described in relation with FIG. 2, operation 300 outputs data corresponding to the multiplication of the unmasked input data, here data a and b, and masked with a mask, here mask Mi4, independent from the masks of the input data.

An advantage of this implementation mode is that all the operations are implemented by a lookup table and that all the compensation operations have the same duration of implementation. This enables to protect the secure multiplication operation against timing-type attacks where an ill-intentioned user is capable of deducing from the time of computation of an operation the data processed by the operation.

Figure 5:
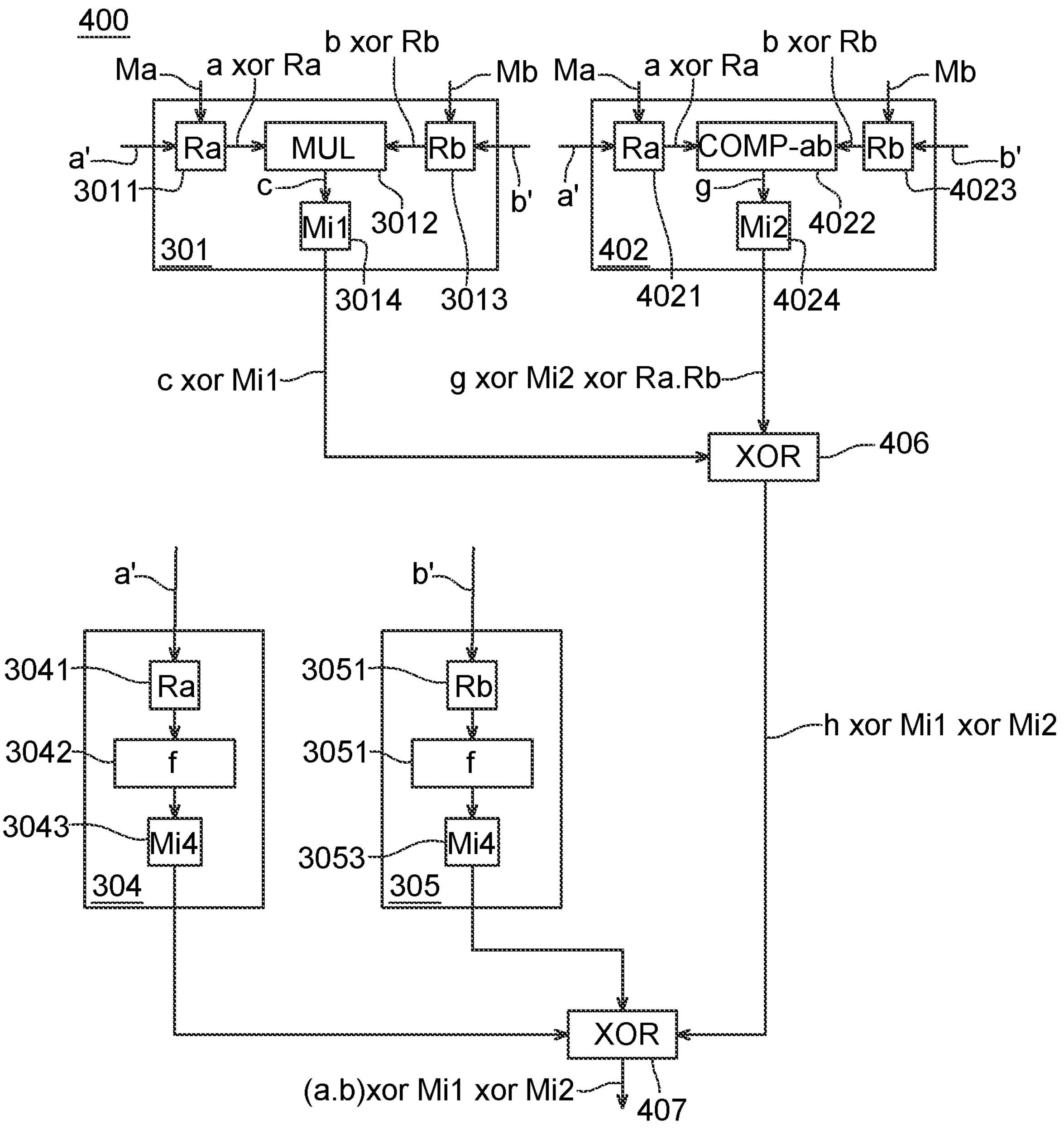
FIG. 5 very schematically shows in the form of blocks another more detailed implementation mode of a secure operation of multiplication of masked data.

FIG. 5 schematically shows in the form of blocks a detailed implementation mode of a secure multiplication operation 400 of the type of the multiplication operation 250 described in relation with FIG. 3.

The secure multiplication operation 400 has elements common with the secure multiplication operation 300 described in relation with FIG. 4. These common elements are not described again herein, and only the differences between operations 300 and 400 are highlighted.

In FIG. 5, and as in FIG. 4, secure multiplication operation 400 receives as an input masked data a' and masked data b', and their masks Ma and Mb, which are linked by the following formula:

$$\begin{cases} a' = a \text{ xor } Ma \\ b' = b \text{ xor } Mb \end{cases} \quad \text{Math 15}$$

wherein:

a is the unmasked data a'; and b is the unmasked data b'.

Secure multiplication operation 400 comprises:

the operation 301 of multiplication of the input data already described in relation with FIG. 4;

a single compensation operation 402;

two correction operations 304 and 305 already described in relation with FIG. 4; and two combination operations 406 and 407.

According to an embodiment, each operation 301, 402, 304, 305, 406, and 407 is implemented by a lookup table. Further, each of operations 301, 402, 304, 305, 406, and 407 comprises masking and unmasking sub-operations, or steps.

As described in relation with FIG. 4, operation 301 takes as an input data a', b', Ma, and Mb and outputs masked data c xor Mi1 having their expression given by the following formula:

$$c \text{ xor } Mi1 = (a \cdot b) \text{ xor } (a \cdot Rb) \text{ xor } (b \cdot Ra) \text{ xor } (Ra \cdot Rb) \text{ xor } Mi1 \quad \text{Math 16}$$

Compensation operation 402 combines the combination operations 302 and 303 described in relation with FIG. 4. Compensation operation 402 takes as an input data a', b', Ma, and Mb and outputs masked data g xor Mi2. Operation 402 is formed of the four following sub-operations, or steps:

a mask change operation 4021 (Ra) identical to the sub-operation 3011 of operation 301;

a compensation sub-operation 4022 (COMP-ab);

a mask change sub-operation 4023 (Rb) identical to the sub-operation 3013 of operation 301; and a masking sub-operation 4024 (Mi2).

Sub-operation 4021 receives as an input masked data a' and outputs masked data a xor Ra.

Sub-operation 4023 receives as an input masked data b', and outputs masked data b xor Rb.

Sub-operation 4022 receives as an input the output data of sub-operations 4021 and 4023. Sub-operation 3012 outputs data g having the following expression:

$$g = (a \text{ xor } Ra) \cdot Rb \text{ xor } f(a \text{ xor } Ra \text{ xor } Ma) \text{ xor } (b \text{ xor } Rb) \cdot Ra \text{ xor } f(b \text{ xor } Rb \text{ xor } Mb) \quad \text{Math 17}$$

where f is the function defined in relation with FIG. 4.

By performing a few simplifications, the expression of data g is the following:

$$g = a \cdot Rb \text{ xor } f(a \text{ xor } Ra \text{ xor } Ma) \text{ xor } b \cdot Ra \text{ xor } f(b \text{ xor } R \text{ xor } Mb) \quad \text{Math 18}$$

Masking sub-operation 4024 receives as an input data g and outputs data g xor Mi2 xor Ra·Rb corresponding to data g masked with an intermediate mask Mi2 xor Ra·Rb.

Compensation operations 402 enables to remove the terms a·Rb, b·Ra, and Ra·Rb present in the data c resulting from operation 301.

Combination operation 406 receives the output data of operations 301 and 402 and applies thereto an EXCLUSIVE OR type operation to deliver masked data h xor Mi1 xor Mi2 where Mi1 xor Mi2 is the mask. Masked data h xor Mi1 xor Mi2 are provided by the following mathematical formula:

$$h \text{ xor } Mi1 \text{ xor } Mi2 = c \text{ xor } Mi1 \text{ xor } g \text{ xor } Mi2 \text{ xor } Ra \cdot Rb \quad \text{Math 19}$$

By replacing c and g with their previously-disclosed expressions, and by performing a few simplifications, the expression of masked data h xor Mi1 xor Mi2 is the following:

$$h \text{ xor } Mi1 \text{ xor } Mi2 = (a \cdot b) \text{ xor } f(a \text{ xor } Ra \text{ xor } Ma) \text{ xor } f(b \text{ xor } Rb \text{ xor } Mb) \text{ xor } Mi1 \text{ xor } Mi2 \quad \text{Math 20}$$

Operations 304 and 305 receive as an input, respectively, masked data a' and b' and respectively deliver masked data f(a' xor Ra) xor Mi4 and f(b' xor Rb) xor Mi4.

As described in relation with FIG. 4, combination operation 407 receives as an input the output data of operations 406, 304, and 305 and combines them to obtain the final result data of the secure multiplication operation 400. For this purpose, operation 407 performs an EXCLUSIVE OR operation of all the data that it receives, more precisely the final result data are given by the following mathematical formula:

$$h \text{ xor } Mi1 \text{ xor } Mi2 \text{ xor } f(a' \text{ xor } Ra) \text{ xor } Mi4 \text{ xor } f(b' \text{ xor } Rb) \text{ xor } Mi4 \quad \text{Math 21}$$

By replacing h with its previously-disclosed expression and by performing a few simplifications, the expression of the final result data is the following:

$$(a \cdot b) \text{ xor } Mi1 \text{ xor } Mi2 \quad \text{Math 22}$$

Thus, and as described in relation with FIG. 3, operation 400 outputs data corresponding to the multiplication of the unmasked input data, here data a and b, and masked with a mask independent from the masks of the input data, here mask Mi1 xor Mi2.

Operation 500 has the same advantages as the operation 300 described in relation with FIG. 4.

Figure 6:
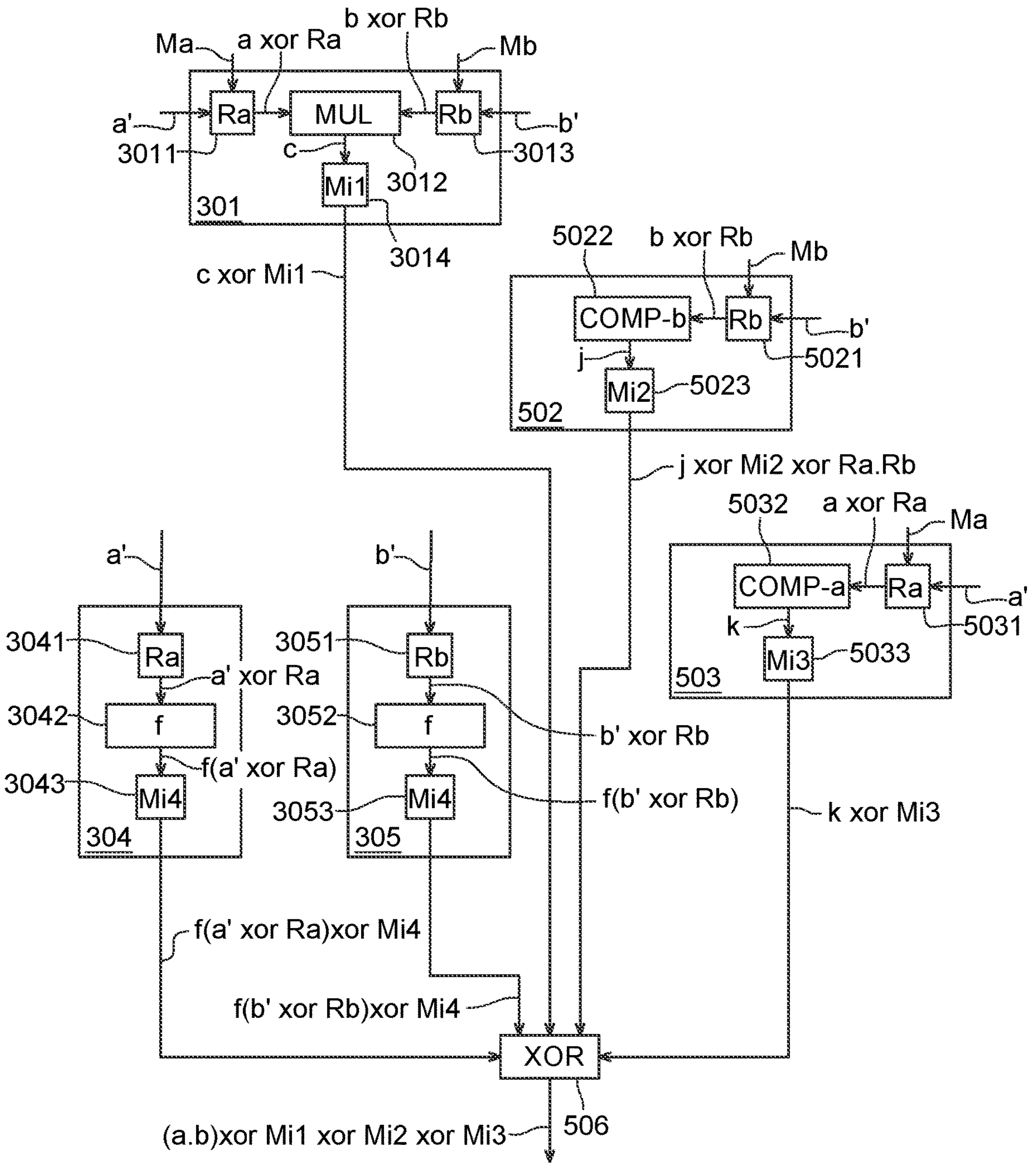
FIG. 6 very schematically shows in the form of blocks another more detailed implementation mode of a secure operation of multiplication of masked data.

FIG. 6 schematically shows in the form of blocks a detailed implementation mode of a secure multiplication operation 500 of the type of the multiplication operation 250 described in relation with FIG. 3.

The secure multiplication operation 500 has elements common with the secure multiplication operation 300 described in relation with FIG. 4. These common elements are not described again herein, and only the differences between operations 300 and 500 are highlighted.

In FIG. 6, secure multiplication operation 500 receives as an input masked data a' and masked data b', and their masks Ma and Mb, which are linked by the following formulas:

$$\begin{cases} a' = a \text{ xor } Ma \\ b' = b \text{ xor } Mb \end{cases} \quad \text{Math 23}$$

wherein:

- a is the unmasked data a'; and
- b is the unmasked data b'.

Secure multiplication operation 500 comprises:

- the operation 301 of multiplication of the input data already described in relation with FIG. 4;
- two compensation operations 502 and 503;
- two correction operations 304 and 305 already described in relation with FIG. 4; and
- a combination operation 506.

According to an embodiment, each operation 301, 502, 503, 304, 305, and 506 is implemented by a lookup table. Further, each of operations 301, 502, 503, 304, 305, and 506 comprises masking and unmasking sub-operations, or steps.

As described in relation with FIG. 4, operation 301 takes as an input data a', b', Ma, and Mb and outputs masked data c xor Mi1 having their expression given by the following formula:

$$c \text{ xor } Mi1 = (a \cdot b) \text{ xor } (a \cdot Rb) \text{ xor } (b \cdot Ra) \text{ xor } (Ra \cdot Rb) \text{ xor } Mi1 \quad \text{Math 24}$$

Operation 502 receives as an input masked data b' and outputs masked data j xor Mi2 xor Ra·Rb. Operation 502 is formed of the three following sub-operations or steps:

- a mask change sub-operation 5021 (Rb) identical to the sub-operation 3013 of operation 301;
- a compensation sub-operation 5022 (COMP-b); and
- a masking sub-operation 5023 (Mi2).

Sub-operation 5021 receives as an input masked data b', and outputs masked data b xor Rb.

Sub-operation 5022 receives as an input the output data of sub-operation 5021. Sub-operation 5022 outputs data j having the following expression:

$$j = ((b \text{ xor } Rb) \cdot Ra) \text{ xor } f(b \text{ xor } Rb \text{ xor } Mb) \quad \text{Math 25}$$

where f is the function defined in relation with FIG. 4.

By performing a few simplifications, the expression of data j is the following:

$$= (b \cdot Ra) \text{ xor } (Ra \cdot Rb) \text{ xor } (a \cdot Rb) \text{ xor } f(b' \text{ xor } Rb) \quad \text{Math 26}$$

Masking sub-operation 5023 receives as an input data j and outputs data j xor Mi2 xor Ra·Rb corresponding to data j masked with an intermediate mask Mi2 xor Ra·Rb.

Operation 503 receives as an input masked data a' and outputs masked data k xor Mi3. Operation 503 is formed of the three following sub-operations or steps:

- a mask change operation 5023 (Ra) identical to the sub-operation 3011 of operation 301;
- a compensation sub-operation 5032 (COMP-a); and
- a masking sub-operation 5033 (Mi3).

Sub-operation 5031 receives as an input masked data a', and outputs masked data a xor Ra.

Sub-operation 5032 receives as an input the output data of sub-operation 5031. Sub-operation 5032 outputs data k having the following expression:

$$k = ((a \text{ xor } Ra) \cdot Rb) \text{ xor } f(a \text{ xor } Ra \text{ xor } Ma) \quad \text{Math 27}$$

where f is the function defined in relation with FIG. 4.

By performing a few simplifications, the expression of data k is the following:

$$k = (a \cdot Rb) \text{ xor } (Ra \cdot Rb) \text{ xor } (b \cdot Ra) \text{ xor } f(a' \text{ xor } Ra) \quad \text{Math 28}$$

Masking sub-operation 5033 receives as an input data k, and outputs data k xor Mi3 corresponding to data k masked with an intermediate mask Mi3.

Compensation operations 502 and 503 enable to remove the terms a·Rb, b·Ra, and Ra·Rb present in the data c resulting from operation 301.

As described in relation with FIG. 4, operations 304 and 305 receive as an input, respectively, masked data a' and b' and respectively deliver masked data f(a' xor Ra) xor Mi4 and f(b' xor Rb) xor Mi4.

Combination operation 506 receives as an input the output data of operations 301, 502, 503, 304, and 305 and combines them to obtain the final result data of the secure multiplication operation 500. For this purpose, operation 506 performs an EXCLUSIVE OR operation of all the data that it receives, more precisely the final result data are given by the following mathematical formula:

$$c \text{ xor } Mi1 \text{ xor } j \text{ xor } Mi2 \text{ xor } Ra \cdot Rb \text{ xor } k \text{ xor } Mi3 \text{ xor } f(a' \text{ xor } Ra) \text{ xor } Mi4 \text{ xor } f(b' \text{ xor } Rb) \text{ xor } Mi4 \qquad \text{Math 29}$$

By replacing data c, j, and k with their respective previously-disclosed expressions and by performing a few simplifications, the expression of the final result data is the following:

$$(a \cdot b) \text{ xor } Mi1 \text{ xor } Mi2 \text{ xor } Mi3 \qquad \text{Math 30}$$

Thus, and as described in relation with FIG. 2, operation 500 outputs data corresponding to the multiplication of the unmasked input data, here data a and b, and masked with a mask independent from the masks of the input data, here mask Mi1 xor Mi2 xor Mi3.

Operation 500 has the same advantages as the operation 300 described in relation with FIG. 4.

Various embodiments and variants have been described. Those skilled in the art will understand that certain features of these various embodiments and variants may be combined, and other variants will occur to those skilled in the art. In particular, other embodiments of secure operations are within the abilities of those skilled in the art, who may imagine other orders of the operations of the secure operation.

Finally, the practical implementation of the described embodiments and variations is within the abilities of those skilled in the art based on the functional indications given hereabove.

Operation of multiplication (250; 300; 400; 500) may be summarized as including multiplication of first data (A'; a') masked with a first mask (MA; Ma) and of second data (B'; b') masked with a second mask (MB; Mb), wherein: the first mask (MA; Ma) is replaced with a third mask (RA; Ra) and the second mask is replaced with a fourth mask (RB; Rb); the multiplication operation (250; 300; 400; 500) including at least one first compensation operation (302, 303; 402; 502, 503) implemented by at least one first lookup table; and the result data (C') of said multiplication operation (250; 300; 400; 500) are third data corresponding to the multiplication of the first unmasked data (A; a) and of the second data (B; b) masked with a fifth mask (MC; Mc) independent from the first, second, third, and fourth masks (MA, MB, RA, RB; Ma, Mb, Ra, Rb).

Method of implementation of an operation of multiplication (250; 300; 400; 500) may be summarized as including multiplication of first data (A'; a') masked with a first mask (MA; Ma) and of second data (B'; b') masked with a second mask (MB; Mb), wherein: the first mask (MA; Ma) is replaced with a third mask (RA; Ra) and the second mask is replaced with a fourth mask (RB; Rb); the multiplication operation (250; 300; 400; 500) including at least one first compensation operation (302, 303; 402; 502, 503) implemented by at least one first lookup table; and the result data (C') of said multiplication operation (250; 300; 400; 500) are third data corresponding to the multiplication of the first unmasked data (A; a) and of the second data (B; b) masked with a fifth mask (MC; Mc) independent from the first, second, third, and fourth masks (MA, MB, RA, RB; Ma, Mb, Ra, Rb).

The type of masking used may be a masking using a logic operation of EXCLUSIVE OR type.

The multiplication operation (250; 300; 400; 500) may further include the implementation of a first multiplication (301) of the first and second masked data (a', b').

Said implementation of a first multiplication (301) may include masking and/or unmasking sub-operations (3011, 3013, 3014).

Said at least one compensation operation (302, 303; 402; 502, 503) may enable to remove at least one term depending on the first or second masks (Ma, Mb) from the result of said first multiplication of the first and second masked data (a', b').

The compensation operation (302, 303; 402; 502, 503) may implement a function f satisfying the following inequality:

$$f(11) \neq 11 \qquad \text{[Math 31]}$$

where 11 is the binary representation of number 3.

According to an example, function f implements a function sqk defined by the following mathematical formula:

$$sqk(x) = N \cdot x^2 \qquad \text{Math 32}$$

wherein:

operator · designates the logic multiplication operation;

N is a scalar define in the way that sqk(x)=y, with x=x1x0 (x0 being the less significant bit, and x1 the most significant bit) and y=y1y0 (y0 being the less significant bit, and y1 the most significant bit), results in y1=x0 and y0=x0 xor x1;

$x^2$ corresponds to the result of the operation x·x.

Said at least one compensation operation (302, 303; 402; 502, 503) may include masking and/or unmasking sub-operations (3021, 3023, 3024, 3031, 3033, 3034; 4021, 4022, 4024; 5021, 5023, 5031, 5033).

The multiplication operation (250; 300; 400; 500) may include the implementation of at least one first correction operation (304, 305) enabling to remove at least one term depending on function f.

Said at least one correction operation (304, 305) may include masking and/or unmasking sub-operations (3041, 3043, 3051, 3053).

Electronic device may be summarized as including adapting to implementing the methods disclosed herein.

In an embodiment, a method comprises: multiplying, using an electronic device, first data masked with a first mask by second data masked with a second mask; and protecting the first data and the second data during the multiplying. The multiplying and protecting includes: remasking the first data with a third mask; remasking the second data with a fourth mask; executing one or more compensation operations using one or more look-up tables; and generating third data masked with a fifth mask. The fifth mask is independent of the first, second, third, and fourth masks. The third data corresponds to the first data multiplied by the second data. In an embodiment, the method comprises using EXCLUSIVE OR type masking. In an embodiment, the multiplying and protecting comprises performing a first multiplication of the first masked data and the second masked data. In an embodiment, the first multiplication comprises applying masking, unmasking, or masking and unmasking sub-operations. In an embodiment, a compensation operation of the one or more compensation operations removes at least one term depending on the first mask or depending on the second mask from a result of said first multiplication. In an embodiment, a compensation operation of the one or more compensation operations implements a function f satisfying the following inequality:

$$f(11) \neq 11$$

where 11 is a binary representation of number 3. In an embodiment, the function f is a square-scale function sqk defined by:

$$sqk(x)=N\cdot x^2$$

wherein:

operator · designates a logic multiplication operation;

N is a scalar satisfying sqk(x)=y, with x=x1x0 and y=y1y0, results in y1=x0 and y0=x0 xor x1, with x0 being the least significant bit and x1 being the most significant bit, and y0 being the least significant bit and y1 being the most significant bit; and $x^2$ corresponds to x·x.

In an embodiment, a compensation operation of the one or more compensation operations comprises masking, unmasking, or masking and unmasking sub-operations. In an embodiment, the multiplying and protecting comprises one or more correction operations removing at least one term depending on function f. In an embodiment, a correction operation of said one or more correction operations comprises masking, unmasking, or masking and unmasking sub-operations. In an embodiment, the multiplying and protecting comprises: applying a first compensation operation to a result of the first multiplication of the first masked data and the second masked data; applying a second compensation operation to a result of the first compensation operation; applying a first correction operation to the first masked data; applying a second correction operation to the second masked data; and applying a combination operation combining results of the second compensation operation, the first correction operation, and the second correction operation, generating the third data masked with the fifth mask. In an embodiment, the multiplying and protecting comprises: applying a first compensation operation to a result of the first multiplication of the first masked data and the second masked data; applying a first combination operation combining the result of the first multiplication of the first masked data and the second masked data with a result of the first compensation operation; applying a first correction operation to the first masked data; applying a second correction operation to the second masked data; and applying a second combination operation combining results of the first combination operation, the first correction operation, and the second correction operation, generating the third data masked with the fifth mask. In an embodiment, the multiplying and protecting comprises: applying a first compensation operation to the first masked data; applying a second compensation operation to the second masked data; applying a first correction operation to the first masked data; applying a second correction operation to the second masked data; and applying a combination operation combining results of: the first multiplication operation of the first masked data and the second masked data; the first compensation operation; the second compensation operation; the first correction operation; and the second correction operation, generating the third data masked with the fifth mask.

In an embodiment, a device includes a memory, which, in operation, stores one or more look-up tables, and cryptographic circuitry coupled to the memory. The cryptographic circuitry, in operation, multiplies first data masked with a first mask by second data masked with a second mask, and protects the first data and the second data during the multiplying. The multiplying and protecting includes remasking the first data with a third mask, remasking the second data with a fourth mask, executing one or more compensation operations using one or more of the one or more look-up tables, and generating third data masked with a fifth mask.

The fifth mask is independent of the first, second, third, and fourth masks. The third data corresponds to the first data multiplied by the second data. In an embodiment, the cryptographic circuitry, in operation, uses EXCLUSIVE OR type masking. In an embodiment, the cryptographic circuitry, in operation, performs a first multiplication of the first masked data and the second masked data. In an embodiment, the first multiplication comprises applying masking, unmasking, or masking and unmasking sub-operations.

In an embodiment, a compensation operation of the one or more compensation operations removes at least one term depending on the first mask or depending on the second mask from a result of said first multiplication. In an embodiment, a compensation operation of the one or more compensation operations implements a function f satisfying the following inequality:

$$f(11)\neq 11$$

where 11 is a binary representation of number 3. In an embodiment, the function f is a square-scale function sqk defined by:

$$sqk(x)=N\cdot x^2$$

wherein:

operator · designates a logic multiplication operation;

N is a scalar satisfying sqk(x)=y, with x=x1x0 and y=y1y0, results in y1=x0 and y0=x0 xor x1, with x0 being the least significant bit and x1 being the most significant bit, and y0 being the least significant bit and y1 being the most significant bit; and $x^2$ corresponds to x·x.

In an embodiment, a compensation operation of the one or more compensation operations comprises masking, unmasking, or masking and unmasking sub-operations. In an embodiment, the multiplying and protecting comprises one or more correction operations removing at least one term depending on function f. In an embodiment, a correction operation of said one or more correction operations comprises masking, unmasking, or masking and unmasking sub-operations. In an embodiment, the cryptographic circuitry, in operation: applies a first compensation operation to a result of the first multiplication of the first masked data and the second masked data; applies a second compensation operation to a result of the first compensation operation; applies a first correction operation to the first masked data; applies a second correction operation to the second masked data; and applies a combination operation combining results of the second compensation operation, the first correction operation, and the second correction operation, generating the third data masked with the fifth mask. In an embodiment, the cryptographic circuitry, in operation: applies a first compensation operation to a result of the first multiplication of the first masked data and the second masked data; applies a first combination operation combining the result of the first multiplication of the first masked data and the second masked data with a result of the first compensation operation; applies a first correction operation to the first masked data; applies a second correction operation to the second masked data; and applies a second combination operation combining results of the first combination operation, the first correction operation, and the second correction operation, generating the third data masked with the fifth mask. In an embodiment, the cryptographic circuitry, in operation: applies a first compensation operation to the first masked data; applies a second compensation operation to the second masked data; applies a first correction operation to the first masked data; applies a second correction operation to the second masked data; and applies a combination operation combining results of: the first multiplication operation of the first masked data and the second masked data; the first compensation operation; the second compensation operation; the first correction operation; and the second correction operation, generating the third data masked with the fifth mask.

In an embodiment, a system comprises an application processor, which, in operation, executes one or more applications, and cryptographic circuitry coupled to the application processor. The cryptographic circuitry, in operation, multiplies first data masked with a first mask by second data masked with a second mask, and protects the first data and the second data during the multiplying. The multiplying and protecting includes: remasking the first data with a third mask; remasking the second data with a fourth mask; executing one or more compensation operations using one or more look-up tables; and generating third data masked with a fifth mask. The fifth mask is independent of the first, second, third, and fourth masks. The third data corresponds to the first data multiplied by the second data. In an embodiment, the cryptographic circuitry, in operation, performs a first multiplication of the first masked data and the second masked data. In an embodiment, a compensation operation of the one or more compensation operations implements a function f satisfying the following inequality:

$$f(11)\neq 11$$

where 11 is a binary representation of number 3.

In an embodiment, a non-transitory computer-readable medium's contents configure cryptographic circuitry to perform a method. The method comprises multiplying first data masked with a first mask by second data masked with a second mask, and protecting the first data and the second data during the multiplying. The multiplying and protecting includes: remasking the first data with a third mask; remasking the second data with a fourth mask; executing one or more compensation operations using one or more look-up tables; and generating third data masked with a fifth mask. The fifth mask is independent of the first, second, third, and fourth masks. The third data corresponds to the first data multiplied by the second data. In an embodiment, the multiplying and protecting comprises performing a first multiplication of the first masked data and the second masked data; and a compensation operation of the one or more compensation operations implements a function f satisfying the following inequality:

$$f(11)\neq 11$$

where 11 is a binary representation of number 3. In an embodiment, the contents comprise the one or more look-up tables. In an embodiment, the contents comprise instructions executed by the cryptographic circuitry.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:

multiplying, using cryptographic circuitry of an electronic device, first data masked with a first mask by second data masked with a second mask; and protecting, using the cryptographic circuitry, the first data and the second data during the multiplying, the multiplying and protecting including:

remasking the first data with a third mask;

remasking the second data with a fourth mask;

executing one or more compensation operations using one or more look-up tables stored in a memory of the electronic device; and generating third data masked with a fifth mask, wherein:

the fifth mask is independent of the first, second, third, and fourth masks; and the third data corresponds to the first data multiplied by the second data.

2. The method according to claim 1, comprising using EXCLUSIVE OR type masking.

3. The method of claim 1, wherein the multiplying and protecting comprises performing a first multiplication of the first masked data and the second masked data.

4. The method according to claim 3, wherein said first multiplication comprises applying masking, unmasking, or masking and unmasking sub-operations.

5. The method according to claim 3, wherein a compensation operation of the one or more compensation operations removes at least one term depending on the first mask or depending on the second mask from a result of said first multiplication.

6. The method of claim 3, wherein the multiplying and protecting comprises:

applying a first compensation operation to a result of the first multiplication of the first masked data and the second masked data;

applying a second compensation operation to a result of the first compensation operation;

applying a first correction operation to the first masked data;

applying a second correction operation to the second masked data; and applying a combination operation combining results of the second compensation operation, the first correction operation, and the second correction operation, generating the third data masked with the fifth mask.

7. The method of claim 3, wherein the multiplying and protecting comprises:

applying a first compensation operation to a result of the first multiplication of the first masked data and the second masked data;

applying a first combination operation combining the result of the first multiplication of the first masked data and the second masked data with a result of the first compensation operation;

applying a first correction operation to the first masked data;

applying a second correction operation to the second masked data; and applying a second combination operation combining results of the first combination operation, the first correction operation, and the second correction operation, generating the third data masked with the fifth mask.

8. The method of claim 3, wherein the multiplying and protecting comprises:

applying a first compensation operation to the first masked data;

applying a second compensation operation to the second masked data;

applying a first correction operation to the first masked data;

applying a second correction operation to the second masked data; and applying a combination operation combining results of:

the first multiplication operation of the first masked data and the second masked data;

the first compensation operation;

the second compensation operation;

the first correction operation; and the second correction operation, generating the third data masked with the fifth mask.

9. The method according to claim 1, wherein a compensation operation of the one or more compensation operations implements a function f satisfying the following inequality:

$$f(11)\neq 11$$

where 11 is a binary representation of number 3.

10. The method according to claim 9, wherein the function f is a square-scale function sqk defined by:

$$sqk(x)=N\cdot x^2$$

wherein:

operator · designates a logic multiplication operation;

N is a scalar satisfying sqk(x)=y, with x=x1x0 and y=y1y0, results in y1=x0 and y0=x0 xor x1, with x0 being the least significant bit and x1 being the most significant bit, and y0 being the least significant bit and y1 being the most significant bit; and $x^2$ corresponds to x·x.

11. The method according to claim 9, wherein the multiplying and protecting comprises one or more correction operations removing at least one term depending on function f.

12. The method according to claim 11, wherein a correction operation of said one or more correction operations comprises masking, unmasking, or masking and unmasking sub-operations.

13. The method according to claim 1, wherein a compensation operation of the one or more compensation operations comprises masking, unmasking, or masking and unmasking sub-operations.

14. A device, comprising:

a memory, which, in operation, stores one or more look-up tables; and cryptographic circuitry coupled to the memory, wherein the cryptographic circuitry, in operation:

multiplies first data masked with a first mask by second data masked with a second mask; and protects the first data and the second data during the multiplying, the multiplying and protecting including:

remasking the first data with a third mask;

remasking the second data with a fourth mask;

executing one or more compensation operations using one or more of the one or more look-up tables; and generating third data masked with a fifth mask, wherein:

the fifth mask is independent of the first, second, third, and fourth masks; and the third data corresponds to the first data multiplied by the second data.

15. The device according to claim 14, wherein the cryptographic circuitry, in operation, uses EXCLUSIVE OR type masking.

16. The device according to claim 14, wherein the cryptographic circuitry, in operation, performs a first multiplication of the first masked data and the second masked data.

17. The device according to claim 16, wherein the first multiplication comprises applying masking, unmasking, or masking and unmasking sub-operations.

18. The device according to claim 16, wherein a compensation operation of the one or more compensation operations removes at least one term depending on the first mask or depending on the second mask from a result of said first multiplication.

19. The device of claim 16, wherein the cryptographic circuitry, in operation:

applies a first compensation operation to a result of the first multiplication of the first masked data and the second masked data;

applies a second compensation operation to a result of the first compensation operation;

applies a first correction operation to the first masked data;

applies a second correction operation to the second masked data; and applies a combination operation combining results of the second compensation operation, the first correction operation, and the second correction operation, generating the third data masked with the fifth mask.

20. The device of claim 16, wherein the cryptographic circuitry, in operation:

applies a first compensation operation to a result of the first multiplication of the first masked data and the second masked data;

applies a first combination operation combining the result of the first multiplication of the first masked data and the second masked data with a result of the first compensation operation;

applies a first correction operation to the first masked data;

applies a second correction operation to the second masked data; and applies a second combination operation combining results of the first combination operation, the first correction operation, and the second correction operation, generating the third data masked with the fifth mask.

21. The device of claim 16, wherein the cryptographic circuitry, in operation:

applies a first compensation operation to the first masked data;

applies a second compensation operation to the second masked data;

applies a first correction operation to the first masked data;

applies a second correction operation to the second masked data; and applies a combination operation combining results of:

the first multiplication operation of the first masked data and the second masked data;

the first compensation operation;

the second compensation operation;

the first correction operation; and the second correction operation, generating the third data masked with the fifth mask.

22. The device according to claim 14, wherein a compensation operation of the one or more compensation operations implements a function f satisfying the following inequality:

$$f(11)\neq 11$$

where 11 is a binary representation of number 3.

23. The device according to claim 22, wherein the function f is a square-scale function sqk defined by:

$$sqk(x)=N\cdot x^2$$

wherein:

operator · designates a logic multiplication operation;

N is a scalar satisfying sqk(x)=y, with x=x1x0 and y=y1y0, results in y1=x0 and y0=x0 xor x1, with x0 being the least significant bit and x1 being the most significant bit, and y0 being the least significant bit and y1 being the most significant bit; and $x^2$ corresponds to $x\cdot x$.

24. The device according to claim 22, wherein the multiplying and protecting comprises one or more correction operations removing at least one term depending on function f.

25. The device according to claim 24, wherein a correction operation of said one or more correction operations comprises masking, unmasking, or masking and unmasking sub-operations.

26. The device according to claim 14, wherein a compensation operation of the one or more compensation operations comprises masking, unmasking, or masking and unmasking sub-operations.

27. A system, comprising:

an application processor, which, in operation, executes one or more applications; and cryptographic circuitry coupled to the application processor, wherein the cryptographic circuitry, in operation:

multiplies first data masked with a first mask by second data masked with a second mask; and protects the first data and the second data during the multiplying, the multiplying and protecting including:

remasking the first data with a third mask;

remasking the second data with a fourth mask;

executing one or more compensation operations using one or more look-up tables stored in a memory of the application processor; and generating third data masked with a fifth mask, wherein:

the fifth mask is independent of the first, second, third, and fourth masks; and the third data corresponds to the first data multiplied by the second data.

28. The system according to claim 27, wherein the cryptographic circuitry, in operation, performs a first multiplication of the first masked data and the second masked data.

29. The system according to claim 28, wherein a compensation operation of the one or more compensation operations implements a function f satisfying the following inequality:

$$f(11)\neq 11$$

where 11 is a binary representation of number 3.

30. A non-transitory computer-readable medium having contents which configure cryptographic circuitry to perform a method, the method comprising:

multiplying first data masked with a first mask by second data masked with a second mask; and protecting the first data and the second data during the multiplying, the multiplying and protecting including:

remasking the first data with a third mask;

remasking the second data with a fourth mask;

executing one or more compensation operations using one or more look-up tables stored in a memory of the cryptographic circuitry; and generating third data masked with a fifth mask, wherein:

the fifth mask is independent of the first, second, third, and fourth masks; and the third data corresponds to the first data multiplied by the second data.

31. The non-transitory computer-readable medium of claim 30, wherein, the multiplying and protecting comprises performing a first multiplication of the first masked data and the second masked data; and a compensation operation of the one or more compensation operations implements a function f satisfying the following inequality:

$$f(11)\neq 11$$

where 11 is a binary representation of number 3.

32. The non-transitory computer-readable medium of claim 30, wherein the contents comprise the one or more look-up tables.

* * * * *